Feb. 7, 1961 P. S. VILES 2,970,893
PRODUCTION OF LIME AND HYDROGEN SULFIDE
Filed June 19, 1958
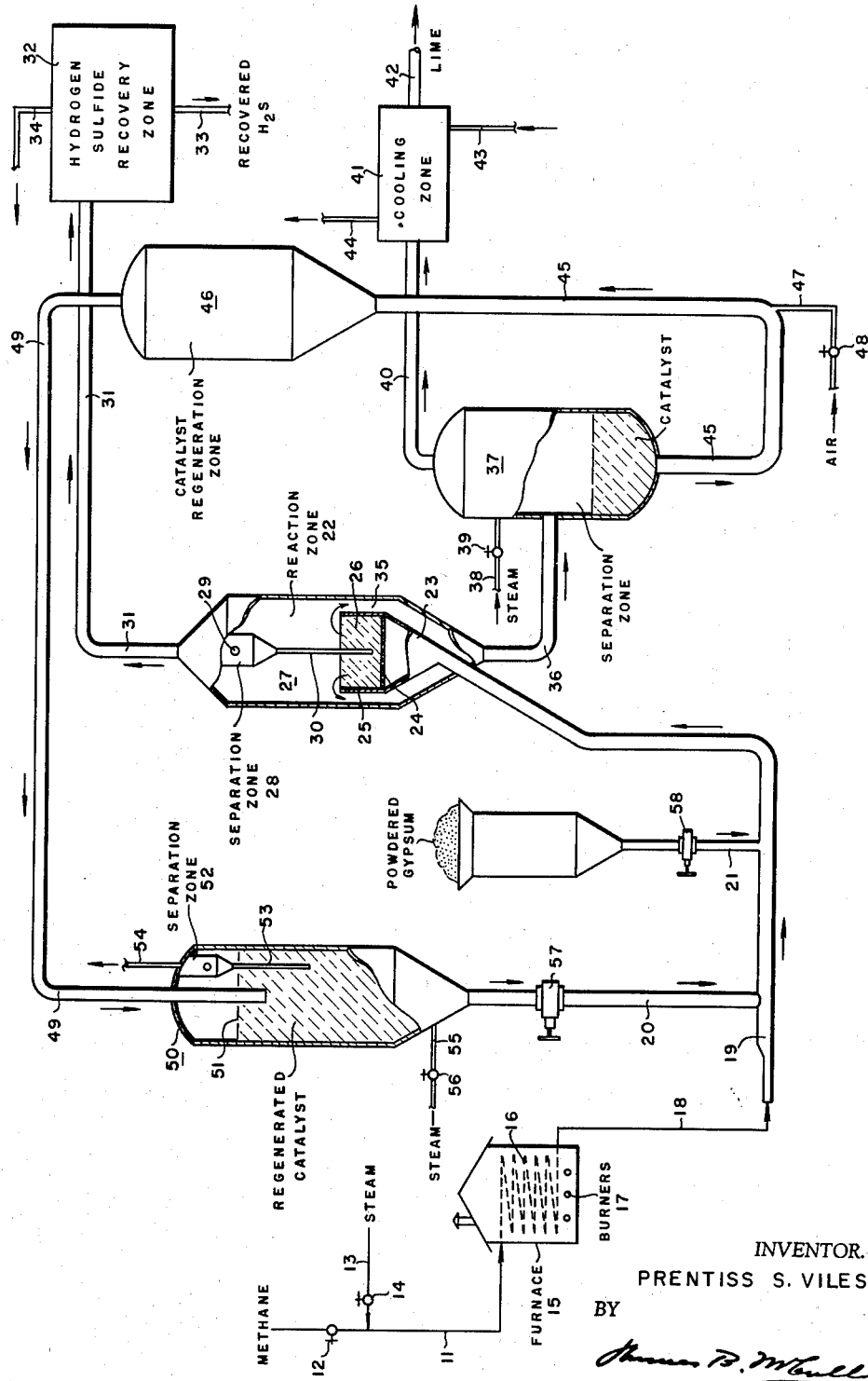
INVENTOR.
PRENTISS S. VILES,
BY
ATTORNEY.

United States Patent Office 2,970,893
Patented Feb. 7, 1961

2,970,893

PRODUCTION OF LIME AND HYDROGEN SULFIDE

Prentiss S. Viles, Baytown, Tex., assignor, by mesne assignments, to Esso Research and Engineering Company, Elizabeth, N.J., a corporation of Delaware Filed June 19, 1958, Ser. No. 743,050

7 Claims. (Cl. 23—181)

The present invention is directed to a method for producing lime and hydrogen sulfide. More particularly, the invention is concerned with the production of lime and hydrogen sulfide from gypsum. In its more specific aspects, the invention is directed to a catalytic method for producing lime and hydrogen sulfide at a substantially reduced temperature.

The present invention may be briefly described as a method for producing lime and hydrogen sulfide which comprises forming a mixture of calcium sulfate and a sulfur-resistant catalyst and then contacting the mixture with a hydrocarbon gas and steam at a temperature within the range from about 850° to about 1500° F. in the absence of free oxygen, the gas and steam being present in amounts in excess of theoretical to form lime and hydrogen sulfide. The hydrogen sulfide and lime are separated from the catalyst and recovered and the recovered lime is then cooled in the absence of free oxygen.

The catalyst employed in the practice of the present invention is a sulfur-resistant catalyst which may be exemplified by cobalt molybdate. Other suitable sulfur-resistant catalysts may be used, such as reducible salts of molybdenum and cobalt.

Preferably, the sulfur-resistant catalyst is employed on a suitable support or carrier. For example, cobalt molybdate in an amount of 12 to 15 percent by weight deposited on a suitable carrier or support, such as alumina, is eminently suitable as a catalyst. The catalyst may comprise an amount within the range from about 1 to about 99 percent by weight of the active catalytic material with the remainder being the support.

Besides alumina, which may be a substantially purified alumina, such as gamma alumina, suitable supports may be zirconia, magnesia, and other materials, such as clay, and the like.

The temperatures employed in the practice of the present invention may range from about 850° to about 1500° F., with a preferred temperature in the range from about 1200° to 1400° F. By virtue of employing a sulfur-resistant catalyst, it is possible to produce lime and hydrogen sulfide at substantially reduced temperatures over that possible heretofore using a hydrocarbon gas.

Pressures suitably may range from about 0 to about 1000 pounds per square inch gauge. Advantageously, when a fluidized operation is employed, pressures may range from about 10 up to about 200 pounds per square inch gauge.

The hydrocarbon gas employed in the practice of the present invention is suitably natural gas or the gaseous components thereof, such as methane, ethane, propane, and butane. It is preferred to use natural gas, although methane and the other gaseous components may be used.

The invention will be further illustrated by reference to the drawing in which the sole figure is a flow diagram of a preferred mode.

Referring now to the drawing, numeral 11 designates a charge line by way of which a gaseous hydrocarbon, such as methane, is introduced into the system by opening valve 12. Discharging into line 11 is a charge line 13, controlled by valve 14, by way of which steam is introduced in admixture with the methane. The steam and methane mixture then flows into a furnace 15 provided with a heating coil 16 and gas burners 17, which raise the temperature of the mixture to a temperature in the range from about 850° to about 1500° F. The heated mixture flows by way of line 18 into a large conduit 19 into which is introduced by way of line 20 a sufficient amount of catalyst, such as cobalt molybdate on alumina, the catalyst being carried through line 19 by the velocity of flow of the mixture of methane and steam. The catalyst is admixed in line 19 with powdered gypsum introduced thereto by way of line 21, and the mixture of catalyst and powdered gypsum are then flowed by way of line 19 into a reaction zone 22, which is a large vessel provided with a cone-shaped member 23 having a grid plate 24. The cone-shaped member 23 is also provided with a wall member 25 and a dense phase of the catalyst and gypsum is maintained above the grid 24 as indicated generally by the numeral 26. Under the temperature conditions and in the presence of hydrocarbons and steam, the gypsum is converted substantially to calcium oxide and hydrogen sulfide.

Above the dense bed 26 is a disperse phase 27, which contains a small amount of the finely divided calcium oxide and perhaps some of the catalyst. To separate the catalyst and calcium oxide from the hydrogen sulfide-containing gases, a separation zone 28 is provided, which may be a cyclone separator or a plurality of cyclone separators in which the gas containing some of the calcium oxide and catalyst may be introduced by way of inlet 29. The separation zone 28 separates the catalyst and calcium oxide from the gaseous products and causes the discharge thereof back into the dense bed 26 via dip leg 30. The hydrogen sulfide-containing gases are then discharged from reaction zone 22 by way of line 31 into a hydrogen sulfide recovery zone 32 for separation and recovery of the hydrogen sulfide by way of line 33. The recovered hydrogen sulfide may then be converted to free sulfur by any of the well-known processes such as by the Klaus process. The separated gases which may contain carbon monoxide, carbon dioxide and some hydrogen, may be withdrawn from zone 32 by line 34 and introduced either into line 19 or into zone 22 as may be desired.

The hydrogen sulfide recovery zone may comprise a suitable absorption tower, such as one employing an ethanolamine, such as mono-, di-, or triethanolamine, for absorption of the hydrogen sulfide from the gas in line 31. Other solutions may be used for recovery and separation of the hydrogen sulfide. For example, a solution of slightly acidic lead acetate may be employed, or the hydrogen sulfide-containing gases may be led into an absorber containing a solution of sodium hydroxide.

The catalyst and lime overflow from dense bed 26 down through the annular space 35 and discharge from zone 22 by way of line 36 into a separation zone 37 which suitably may be of the gravity type but which may comprise a vibrating screen, a centrifugal separator, or an elutriation tower. In the drawing separation zone 37 is of the gravity type with the catalyst separating out by virtue of its difference in gravity from the calcium oxide. Thus, the cobalt molybdate may have a specific gravity in the range from about 3 to about 4, depending on the carrier employed, while the calcium oxide has a specific gravity of about 2.2, which allows separation to be obtained readily.

Steam is introduced into the upper portion of separation zone 37 by way of line 38, controlled by valve 39, to decompose any residual calcium sulfide which may be present in the calcium oxide and to exclude free oxygen and/or air from contact with the lime. The calcium oxide then flows from zone 37 by way of line 40 into a cooling zone 41 and finally the lime is recovered in the absence of air from zone 41 by line 42. Introduced into cooling zone 41 by way of line 43 is a cooling medium which may be steam at a lower temperature or other cooled gas, which is discharged by way of line 44. Suitably, the cooling medium introduced in line 43 may be the methane and steam introduced into the system by lines 11 and 13 and passage of methane and steam through zone 41 will serve to remove heat from the lime and to preheat the methane and steam.

The catalyst separated from the calcium oxide in zone 37 is withdrawn therefrom by line 45 and introduced into a catalyst regeneration zone 46, air being introduced into line 45 by way of line 47, controlled by valve 48, this air serving to transport the catalyst into zone 46 and also to provide oxygen for burning off any carbonaceous material deposited on the catalyst by virtue of the reaction in zone 22. A combustion operation is sustained in zone 46 in which a temperature in the range from about 800 to about 1200° F. is employed to burn off the carbonaceous material and to regenerate the catalyst.

The regenerated catalyst in a suspension of flue gas flows from zone 46 by line 49 into a regenerated catalyst zone 50, line 49 terminating below the level 51 of the catalyst in zone 50. The flue gas is separated from zone 50 by way of separation zone 52 which returns any catalyst in the flue gas back to the catalyst level by way of dip leg 53, while the flue gas may be removed from zone 50 by line 54.

In order to insure that the catalyst is substantially free of oxygen, line 55, controlled by valve 56, introduces steam into the lower part of zone 50 to sweep the catalyst free of any oxygen which may remain in the regenerated catalyst before it is introduced into line 19 through line 20, controlled by valve 57, and prior to introduction of the gypsum into line 19 by way of line 21, controlled by valve 58.

The catalyst and the powdered gypsum suitably have particle sizes in the range from about 100 to 3000 microns to allow ready fluidization thereof. A major amount of the catalyst and the powdered gypsum has a particle size in the range from about 300 to about 1500.

It will be seen from the description taken with the drawing that an improved operation has been provided by way of which calcium sulfate, such as gypsum, is converted to lime and hydrogen sulfide. Lime and hydrogen sulfide may be used in many ways, the hydrogen sulfide being used for conversion to elementary sulfur, while the lime may suitably be used in the production of cement.

The invention is quite advantageous and useful in that the calcium sulfate may be converted to lime and hydrogen sulfide employing hydrocarbon gases at a substantially lower temperature than was possible heretofore by employing a sulfur-resistant catalyst of the type mentioned supra. This quite important in that it is no longer necessary to employ the elevated temperatures which heretofore were necessary where hydrocarbon gases were used to convert calcium sulfate to gypsum.

It is desirable and necessary in the practice of the present invention that an excess of the hydrocarbon gas and steam be employed and that the amount of steam be in excess of that theoretically reactable with the excess of hydrocarbon gas. The presence of an excess of these reactants serves to drive the reaction taking place to completion to form the desirable product.

The present invention may be carried out in apparatus other than that used by way of illustration. For example, a rotary type kiln or a granular bed reactor may be used or one of the so-called raining solids techniques may be employed. Likewise, a moving bed may be used in accordance with the present invention.

In the practice of the present invention employing steam, hydrocarbon gas and a sulfur-resistant catalyst to convert calcium sulfate to lime and $H_2S$, it is possible to control the steam and hydrocarbon gas ratio and the catalyst and calcium sulfate ratio to eliminate back reactions of calcium oxide with carbon dioxide and sulfur dioxide which may be produced in the several reactions which may take place. For example, a steam to methane ratio of greater than 1 to 1 may be used, with a calcium sulfate to catalyst ratio ranging from about 1 to 1 to about 10 to 1 may be employed, with the steam and methane or hydrocarbon gas always being in excess of that theoretically required to convert calcium sulfate to calcium oxide and hydrogen sulfide.

It is also important in the practice of the present invention to conduct the reaction in the absence of free oxygen and to maintain the lime free from contact with free oxygen. This prevents the undesirable formation of carbonates especially by excluding air from contact with the lime.

The nature and objects of the present invention having been completely described and illustrated, what I wish to claim as new and useful and secure by Letters Patent is:

1. A method for producing lime and hydrogen sulfide which comprises contacting finely divided calcium sulfate with a natural gas hydrocarbon and steam in the presence of cobalt molybdate catalyst at a temperature within the range from about 1200° to 1400° F. In the absence of free oxygen, the gas and steam being present in amounts in excess of theoretical, to form lime and hydrogen sulfide-containing gas, separating and recovering said hydrogen sulfide from said gas in an absorption zone, separating said lime from the catalyst by gravity, and then cooling the separated lime in a cooling zone in the absence of free oxygen.

2. A method in accordance with claim 1 in which the catalyst is supported cobalt molybdate.

3. A method for producing lime and hydrogen sulfide which comprises contacting finely divided calcium sulfate with natural gas hydrocarbons and steam in the presence of cobalt molybdate catalyst at a temperature within the range from about 1200° to 1400° F. and at a pressure within the range from about atmospheric to about 1000 pounds per square inch gauge in the absence of free oxygen, the gas and steam being present in amounts in excess of theoretical, to form lime and hydrogen sulfide-containing gas, separating and recovering said hydrogen sulfide from said gas in an absorption zone, separating said lime from the catalyst by gravity, and then cooling the separated lime in a cooling zone in the absence of free oxygen.

4. A method for producing lime and hydrogen sulfide which comprises forming a mixture of finely divided calcium sulfate and cobalt molybdate catalyst, suspending the mixture in natural gas and steam, contacting the suspension at a temperature within the range from about 1200° to 1400° F. in the absence of free oxygen, the gas and steam being present in amounts in excess of theoretical, to form lime and hydrogen sulfide-containing gas, recovering hydrogen sulfide from said gas in an absorption zone, separating said lime from the catalyst by gravity, and then cooling the separated lime in a cooling zone in the absence of free oxygen.

5. A method in accordance with claim 4 in which the catalyst is cobalt molybdate supported on alumina.

6. A method for producing lime and hydrogen sulfide which comprises forming a mixture of finely divided calcium sulfate and cobalt molybdate catalyst, contacting the mixture with natural gas and steam at a temperature within the range from about 1200° to 1400° F. in the absence of free oxygen, the gas and steam being present in amounts in excess of theoretical, to form lime and hydrogen sulfide-containing gas, recovering hydrogen sulfide from said gas in an absorption zone, and separating said lime from the catalyst by gravity.

7. A method in accordance with claim 6 in which the natural gas is methane.

References Cited in the file of this patent

UNITED STATES PATENTS

| | | |
|---|---|---|
| 2,171,966 | Zirngibl et al. | Sept. 5, 1939 |
| 2,369,432 | Byrns | Feb. 13, 1945 |
| 2,510,189 | Nahin | June 6, 1950 |
| 2,740,691 | Burwell | Apr. 3, 1956 |
| 2,887,363 | Viles | May 19, 1959 |